United States Patent [19]

Duurland et al.

[11] Patent Number: 5,404,251
[45] Date of Patent: Apr. 4, 1995

[54] AUTO REVERSE CASSETTE DECK CAPABLE OF RECORDING/REPRODUCING WITH TWO DIFFERENT CASSETTE TYPES AND FORMATS

[75] Inventors: Jozef Duurland; Bernard H. Timmer, both of Baarn; Norbert C. Vollmann, Eindhoven, all of Netherlands

[73] Assignees: U.S. Philips Corporation, New York, N.Y.; Polygram International Holding B.V., Baarn, Netherlands

[21] Appl. No.: 115,730

[22] Filed: Sep. 2, 1993

Related U.S. Application Data

[63] Continuation of Ser. No. 629,861, Dec. 18, 1990, abandoned.

[30] Foreign Application Priority Data

Dec. 18, 1989 [NL] Netherlands ............... 8903088
May 25, 1990 [NL] Netherlands ............... 9001203

[51] Int. Cl.⁶ ............................................. G11B 15/48
[52] U.S. Cl. ........................................ 360/74.5; 360/71; 360/63; 360/132
[58] Field of Search ............... 360/132, 90, 92, 94, 360/96.1, 63, 74.5, 74.1, 71; D14/121

[56] References Cited

U.S. PATENT DOCUMENTS

| | | | |
|---|---|---|---|
| Re. 33,872 | 4/1992 | Koken et al. ............ | 360/132 X |
| 2,468,198 | 4/1949 | Heller . | |
| 2,681,950 | 6/1954 | Owens . | |
| 3,594,008 | 4/1971 | Takagi ................... | 360/94 |
| 3,927,419 | 12/1975 | Tozawa .................. | 360/94 |
| 4,388,660 | 6/1983 | Osanai ................... | 360/90 X |
| 4,525,755 | 6/1985 | Meek ..................... | 360/63 |
| 4,614,270 | 9/1986 | Oishi ..................... | 360/132 X |
| 4,620,254 | 10/1986 | Smith, II ................ | 360/132 |
| 4,853,816 | 8/1989 | Satoh et al. ............. | 360/132 |
| 5,144,502 | 9/1992 | Somers .................. | 360/63 |
| 5,313,342 | 5/1994 | Soda et al. .............. | 360/63 |

FOREIGN PATENT DOCUMENTS 712536 7/1954 United Kingdom .

*Primary Examiner*—Andrew L. Sniezek
*Assistant Examiner*—James T. Wilson
*Attorney, Agent, or Firm*—Brian J. Wieghaus

[57] ABSTRACT

A system is provided which records reproduces signals on/from a magnetic tape in a cassette in longitudinal tracks in two track patterns in two adjacent tape zones which are inscribed/read in opposite directions. The cassettes are non-reversible and comprise one imperforate main wall. Without exception the associated apparatuses comprise, as a standard feature, recording/reproducing signals in the two opposite directions without reversal of the cassette. The system may be constructed as a two-standard system suitable for use with both reversible and non-reversible cassettes in conformity with non-compatible standards on two-standard apparatuses.

13 Claims, 7 Drawing Sheets

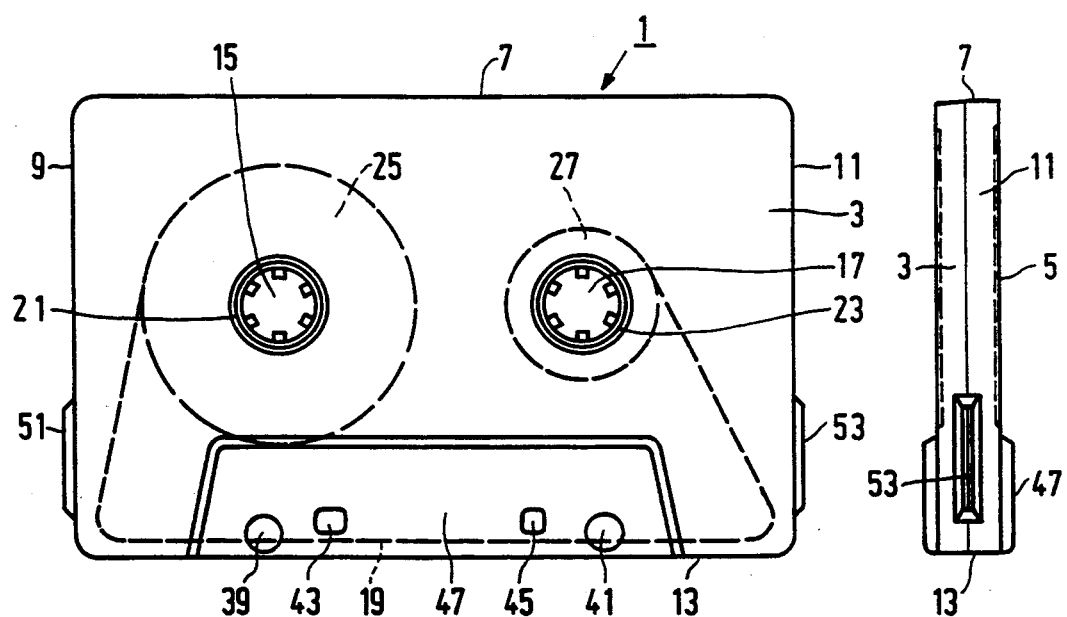
FIG. 1
PRIOR ART
FIG. 2
PRIOR ART
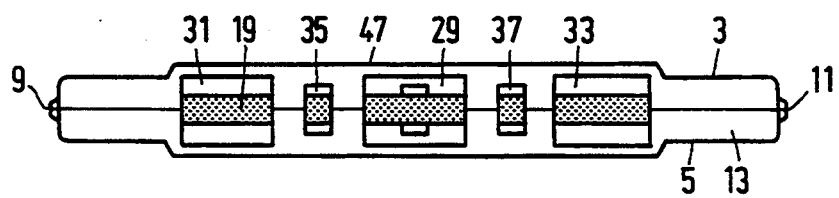
FIG. 3
PRIOR ART

AUTO REVERSE CASSETTE DECK CAPABLE OF RECORDING/REPRODUCING WITH TWO DIFFERENT CASSETTE TYPES AND FORMATS

This is a continuation of application Ser. No. 07/629,861, filed on Dec. 18, 1990, now abandoned.

BACKGROUND OF THE INVENTION

The invention relates to a system for recording and/or reproducing signals on or from magnetic tape in cassettes, which system comprises apparatus and associated cassettes having coplanar reels in conformity with a standard, transport of said magnetic tape being possible in a forward and a reverse direction to record and/or reproduce signals in respective longitudinal forward first track patterns and reverse second track patterns in first and second zones respectively situated adjacent each other over the length of the magnetic tape, so that in a starting position one of the reels is substantially full and the other reel is substantially empty and the magnetic tape is ready to start recording and/or reproduction of the first track pattern and is positioned at the end of the second track pattern, and in an intermediate position the other reel is substantially full and said one reel is substantially empty and the magnetic tape is positioned at the end of the first track pattern.

An example of such a system is the well-known Compact Cassette system which conforms with the international standard IEC 94-7. This system has been enormously successful, which has led to the sale of billions of cassettes and correspondingly huge quantities of associated cassette apparatus in the more than twenty years it has been on the market. Just like any other standard system, the Compact Cassette system leaves only limited room for improvements and innovations. This is because the standard prescribes the principal electrical, magnetic, mechanical and format parameters, so that within the standard it is not possible to deviate from these parameters, which are essential for the compatibility between the cassettes and apparatuses belonging to the system.

The Compact Cassette system was designed for the analog recording and reproduction of audio signals. In recent years there has been an important evolution in digital techniques for recording and reproducing audio signals. Digital techniques enable a substantially higher quality of sound reproduction to be achieved, so that in this respect the Compact Cassette system may be regarded as outmoded. In order to meet consumer demand for a system capable of recording/reproducing digital audio signals on magnetic tape cassettes new systems have been proposed which conform with new standards, comprising new forms of cassette and associated new apparatus. In principle, a new digital audio system could employ conventional apparatus and conventional cassettes in conformity with an existing standard, requiring the necessary modifications to the apparatus and perhaps the use of a different type of magnetic tape. However, the resulting confusion amongst consumers, who would no longer know which cassette to use in which apparatus, would be likely to invoke an antagonistic response from the consumer, not only with respect to the new digital but even with respect to the conventional analog systems.

A new standard deviates from the conventional standard. This makes it necessary for the consumer to purchase new equipment with associated new cassettes. This represents a considerable investment, in particular because the manufacture of the new equipment and the new cassettes requires investment by the manufacturer, leading to higher prices, in particular upon the introduction of a new system. The manufacturer needs time to gain experience with the manufacture of the new products. Therefore, cut-backs in costs through rationalisations and increased production are to be envisaged only after a long period of time. New systems, such as new digital audio systems but for basically the same reasons also other new systems, may thus meet with failure already in the initial stage. The large initial investments made in the development and the start of production may then be regarded as lost, at least partly.

In practice it has been found that systems of the type defined in the opening paragraph are generally succeeded by new systems which are technically more advanced. For example, besides the analog Compact Cassette system the new RDAT system for digital audio recording has appeared on the market. The entirely new cassette differs significantly from the Compact Cassette. The magnetic tape which it employs is protected far more effectively against dust and dirt because the cassette is non-reversible and therefore one of the main walls is imperforate and because the cassette is fully closed by means of a slide and a shutter when the cassette is not located in an associated apparatus. The magnetic tape in the cassette is of a higher quality than is customary for the Compact Cassette. The tracks on the magnetic tape are of small dimensions. As a result of this, adequate protection of the magnetic tape against environmental effects has become more important.

A difference with the Compact Cassette system is that in the RDAT system the cassette is non-reversible. Once the (music) programme on the magnetic tape has been played back the magnetic tape has to be rewound to starting position before the programme can be repeated. This is a disadvantage of the RDAT system in comparison with the conventional Compact Cassette system. Indeed, in the Compact Cassette system the cassettes are reversible and can be played back in both directions so that when the end of the magnetic tape is reached after a programme has been played back in one direction the tape can be played in the other direction by reversing the cassette. Thus, at the end of the complete programme the magnetic tape has arrived at the beginning and after reversal it is ready for replaying the programme. The time-consuming and annoying procedure of completely rewinding the magnetic tape from the end to the beginning is therefore not necessary in the case of the Compact Cassette.

SUMMARY OF THE INVENTION

The invention aims at providing a system of the type defined in the opening paragraph, which is capable of combining the attractive features of the prior-art reversible cassette with those of the prior-art non-reversible cassette and which also lends itself for renovations and innovations which stand a better chance to be successful in the market, and is characterized in that the cassettes are physically non-reversible, in that one of the main walls of the cassette is substantially imperforate, and in that the apparatus comprise means for recording/reproducing signals on/from the magnetic tape in both directions of transport.

In contradistinction to the cassette of the Compact Cassette system, the cassette of the system in accordance with the invention is physically non-reversible in the associated magnetic tape apparatus and has one fully imperforate main wall, so that the cassette is protected more effectively against the ingress of dirt and other environmental influences. Moreover, the associated apparatuses comprise means for recording/reproducing signals on/from the magnetic tape in both directions of transport. This means that the apparatuses are very easy to use. Indeed, after the programme on the cassette has been played back completely the cassette has returned to a fresh starting point and is ready for replaying the programme. The cassette need not be reversed by the user halfway through the programme. It is to be noted that it is known per se to provide Compact Cassette apparatus with means for recording/reproducing signals on/from the magnetic tape in both directions of transport. The transport direction is often reversed fully automatically when the end of the magnetic tape is reached, such apparatus being generally referred to as "auto-reverse" apparatus. In the system in accordance with the invention the new apparatus without exception comprise such an automatic or non-automatic provision as a standard feature. The cost price of such a provision is not very high and is outweighed by the substantial advantages of improved protection of the interior of the cassettes and increased user convenience.

Significant advantages can be achieved by means of an embodiment of the invention which is characterized in that the cassette has an at least partly open front to give elements of an apparatus access to the magnetic tape in the cassette and comprises a sliding cover which is movable between a closed position, in which the front is covered, and an open position, in which the front is uncovered, which sliding cover covers only a small part of the imperforate main wall so that the remainder of the imperforate main wall is constituted mainly by a substantially flat labelling area for applying a label by printing, gluing or other methods. A first advantage is that the interior of the cassette is protected more effectively by the presence of the sliding cover. However, since the sliding cover covers only a small part of the imperforate main wall an important second advantage is obtained, i.e. the greater part of the imperforate main wall is available as a labelling area. This enables the new cassette to be given an entirely different appearance from the prior-art cassettes, which greatly facilitates identification of the new cassettes. In this respect it is to be noted that the fact that one of the main walls is imperforate even enables the new cassette to be distinguished to the touch from conventional cassettes, such as the Compact Cassette, so that the cassettes of the two types can be distinguished readily even without looking. Yet another advantage of the embodiment just described is that the presence of the comparatively large labelling area enables the cassettes to be given a very attractive and aesthetically pleasing appearance. This will make the consumer more aware of the fact that the cassette is a high-quality product resulting from innovation and renovation. It should be born in mind that the consumer has become accustomed to very high quality audio carriers, in particular the well-known Compact Discs. Therefore, it is important that a new high-quality cassette is given an appearance to match that of other new high-quality audio carriers in order to provide a clear distinction relative to the appearance of the prior-art cassettes.

The well-known Compact Cassettes comply with an international standard laid down in Publication 94-7, First Edition 1986, by the International Electrotechnical Commission, 3, rue de Varembé, Geneva, Switzerland. The standard is generally referred to as the IEC standard 94-7. This standard, among others, defines the position of the track patterns on the tape and also the position of the full reel when the cassette is ready for playback or recording at the beginning of the first track pattern.

In order to reduce the cost price of the cassettes in accordance with the invention the system in accordance with the invention may be characterized in that in the starting position, viewed through the imperforate main wall of the cassette with the front of the cassette facing down, the full reel is situated at the right-hand side and the magnetic tape is ready for recording/reproduction of the first track pattern in a direction of transport from the right to the left. The use of this embodiment enables prerecorded cassettes to be loaded with magnetic tape in an efficient manner, employing substantially the same machines already used on a large scale by the relevant industry for loading Compact Cassettes. A further explanation about the how and why of this embodiment will be given hereinafter in the description with reference to the drawings. In this respect another embodiment is important, which is characterized in that the first zone is situated near the main wall which is perforated.

The advantage of the two above embodiments is that the existing machines can be employed for loading so-called "C-O cassettes" (cassettes which have not yet been filled with magnetic tape but which have already been provided with a length of non-magnetic tape attached to both reel hubs). Moreover, a correct cooperation with the magnetic head is ensured. However, a drawback is that the consumer is accustomed to the fact that in Compact Cassettes the full reel is situated at the left of the cassette at the beginning. This may give rise to confusion.

A further embodiment does not have this drawback and is characterized in that, viewed through the imperforate main wall of the cassette with the front of the cassette facing down, in the starting position the full reel is situated at the left-hand side and the magnetic tape is ready for recording/reproduction of the first track pattern in the first direction of transport from left to right, and in that the first zone is situated near the imperforate main wall. In comparison with the Compact Cassette the locations of the two zones on the magnetic tape have been interchanged. This has substantial advantages when a magnetic head is used of a type in which head gaps of different types are disposed above each other and are situated in zones corresponding to the zones on the magnetic tape, one type of head gaps being intended exclusively for cooperation with Compact Cassettes and the other type being intended exclusively for cooperation with cassettes of the system in accordance with the invention in conformity with a new standard. Such a magnetic head must be reversible by means of a mechanically or electrically actuated reversing mechanism. The system in accordance with the invention comprises means for transport of the magnetic tape in both directions of transport. When the last-mentioned embodiment of the invention is employed the position of the magnetic head should merely be related to the transport direction of the magnetic tape. Thus, when a cassette is loaded into the apparatus it is not necessary to detect the cassette type before the magnetic head is engageable in the cassette for cooperation with the magnetic tape and subsequently, if the cassette deviates from the cassette used previously in the apparatus, to reverse the magnetic head. Thus, additional cost involved in coupling a cassette detector to reversing means to reverse the magnetic head, additional switching noises upon insertion of a cassette, and additional loss of time upon insertion of a cassette are avoided.

A magnetic head of the configuration described above has been proposed in the prior Netherlands Patent Application NL 89 01712 herewith incorporated by reference, for use in conjunction with apparatuses constructed for cooperation with Compact Cassettes (analog audio signals) and cassettes with digital audio signals divided among a plurality of parallel tracks. Other head configurations are also possible. For example, in each zone both analog and digital head gaps may be provided so that reversal of the magnetic head is not necessary. Such a configuration is more intricate and hence more expensive and is therefore less likely to be used. When such a magnetic head is used however, it is irrelevant whether the first zone in the system in accordance with the invention is situated at one side or at the other side of the magnetic tape. In such a case the location of the zones as in the last-mentioned embodiment has no advantages. However, it is important that there are neither any disadvantages.

It is to be noted that in non-prerecorded cassettes it is not unusual to load a prewound spool into the cassette before the housing halves of the cassette are placed onto each other and secured to each other. The existing machines can be used for the new cassettes of the system in accordance with the invention, regardless of whether the full reel is situated at the left or the right in the starting position.

The invention not only relates to the system of the type defined in the opening paragraph but also to the associated cassettes and apparatus in conformity with the new standard. An attractive embodiment of a cassette in accordance with the invention is characterized in that the labelling area is covered with a transparent window. This embodiment enables a very pleasing appearance to be obtained. Underneath the transparent window a printed label may be provided, which is protected effectively by the transparent window and is moreover given a high gloss surface due to the presence of the transparent window.

In contrast with a Compact Cassette the new cassette is suited for an embodiment which is characterized in that only the imperforate main wall of the cassette is provided with cassette information. The significance of this embodiment resides in the fact that additional production steps and additional costs in manufacturing the cassette are avoided. The imperforate main wall can be used for applying all the relevant information.

As already stated, it is possible, using an embodiment of the invention, to load the cassettes with prerecorded magnetic tape on existing machines for loading prerecorded Compact Cassettes, with the consequence that in the new cassettes the full spool is situated at the right side and the transport direction of the magnetic tape is from the right to the left when reproduction begins. Moreover, the first zone with the first track pattern of the magnetic tape is situated at the bottom, instead of at the top as in the Compact Cassette. A very important embodiment of the apparatus is very suitable for cooperation with such cassettes in accordance with the invention and is also capable of reproducing signals from reversible cassettes in conformity with the aforementioned standard IEC 94-7 (Compact Cassettes) which embodiment is characterized in that the apparatus comprises automatic detection means for detecting whether an inserted cassette is of said reversible or said non-reversible type, and switching means for changing over the forward and reverse directions of transport depending on the type of cassette detected by the detection means. Despite the use of mutually incompatible cassette types this makes the operation of the apparatus "transparent" to a user, i.e. that for the user of the apparatus the apparatus always performs its corresponding functions in a similar manner and responds similarly to external function control regardless of whether a Compact Cassette or a new cassette in accordance with the invention is to be played. However, internally the apparatus operates in another way after insertion of a Compact Cassette than after insertion of a cassette in accordance with the invention. Preferably, this also applies to other functions such as "fast forward winding" and "fast reverse winding", etc . . .

The invention also relates to a method of digitally recording and/or reproducing sound signals onto or from a magnetic tape housed in a physically non-reversible cassette, the method employing magnetic-head means comprising a head face for sliding cooperation with an active side of the magnetic tape, which head means have a non-symmetrical characteristic which is optimised for one specific direction of travel of the magnetic tape over the head face, in which said recording and/or reproduction is performed in a first direction of tape travel as well as in an opposite second direction of tape travel and in which in both directions of tape travel the tape moves in the said specific direction over the head face of that part of the magnetic-head means which are actually in use.

The system in accordance with the invention thus enables innovations and renovations to be made without high new investments being required from the manufacturer. This is because the cassettes and apparatus in accordance with the invention can remain largely the same, at least mechanically, as the prior-art cassettes and apparatuses. The apparatus in accordance with the invention can be adapted at least to play the conventional cassettes which are still in the consumer's possession. Therefore, such a construction of the system in accordance with the invention provides backward compatibility, i.e. the system includes the conventional standard apparatuses and conventional standard cassettes as a sub-system but adds a new sub-system which allows acceptance of the conventional standard cassettes but which also includes new cassettes defined in a new standard.

Some features of the invention can be found in a number of prior Netherlands Patent Applications filed by the Applicant but not prior to the priority date of the present case, bearing the numbers NL 89-01375 (which corresponds to U.S. application Ser. No. 532,469 filed May 31, 1989) "System for recording/reproducing signals on magnetic tape in cassettes"; NL 89-01605 (which corresponds to U.S. application Ser. No. 545,307 filed Jun. 26, 1989) "System for recording/reproducing signals on/from a magnetic tape in a cassette"; NL 89-01682 (which corresponds to U.S. application Ser. No. 547,741 filed Jul. 3, 1989) "Reversible cassette"; and the afore-mentioned Application NL 89-01712 "Longitudinal magnetic tape recording system, magnetic-tape apparatus for use in the system, and magnetic head for use in the magnetic-tape apparatus".

Further prior inventions suited for use in the system in accordance with the present invention, are described in the Applicant's prior Netherlands Patent Applications, not prior to the priority date of the present case, NL 89-01373 "Thin-film magnetic head and method of manufacturing such a magnetic head"; 89-10592 (which corresponds to U.S. Pat. No. 5,074,486) "System comprising a magnetic-tape cassette and a magnetic-tape cassette apparatus, and magnetic-tape cassette and magnetic-tape cassette apparatus for use in such a system"; 89-02569 (which corresponds to U.S. Pat. No. 5,097,371) "Thin-film magnetic head"; 89-02570 (which corresponds to U.S. Pat. No. 5,115,364) "Thin-film magnetic head"; and European Patent Application 89-201408.5 (which corresponds to U.S. application Ser. No. 532,465 filed Jun. 2, 1989) "Digital transmission system using subband coding of a digital signal".

All the aforementioned Patent Applications are incorporated herewith by reference.

BRIEF DESCRIPTION OF THE DRAWINGS

The invention will now be described in more detail, by way of example not limiting the scope of the invention, with reference to the accompanying diagrammatic drawings in which:

FIG. 1 is a plan view of the prior-art Compact Cassette,

FIG. 2 is a side view of the cassette shown in FIG. 1,

FIG. 3 is a front view of the cassette shown in FIG. 1,

Figure 7:
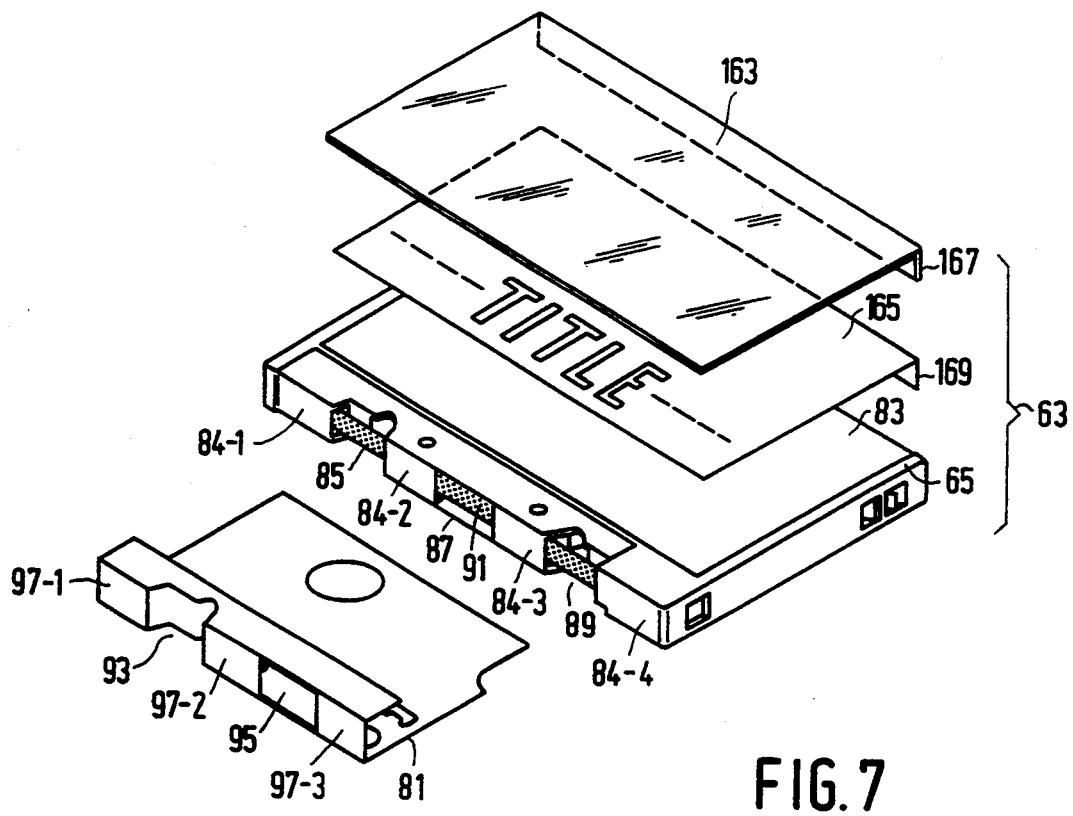
FIG. 7 is a diagrammatic exploded perspective view of a new cassette.

The various Figures are shown to arbitrary scales which are not always the same.

DESCRIPTION OF THE PREFERRED EMBODIMENTS

Compact Cassettes, in the following description also referred to as conventional cassettes, are well-known so that only the principal parts of the cassette will be mentioned briefly. The cassette 1 shown in FIGS. 1, 2 and 3 has a plastic housing comprising main walls 3 and 5 connected by transverse walls in the form of a rear wall 7, side walls 9 and 11, and a front wall 13. Both the main wall 3 and the main wall 5 are formed with openings 15 and 17 which receive the winding spindles of a record-/reproduce apparatus. The Compact Cassette is of the reversible type, which means that the cassette is constructed to be operably positioned on the winding spindles either with its main wall 3 or with its main wall 5 first. The cassette accommodates a magnetic tape 19 and two reel hubs 21 and 23 for supporting the magnetic tape in the form of coplanar spools 25 and 27.

The front wall 13 of the conventional cassette has a plurality of openings and consequently this wall is partly open to allow the passage of elements of record-/reproduce apparatus for cooperation with the magnetic tape. These openings comprise an opening 29 for the passage of magnetic-head means, two openings 31 and 33 for the passage of pressure-roller means, and two smaller openings 35 and 37 intended for the passage of a tape-tension sensor. Both main walls are formed with openings 39 and 41 allowing a capstan of an associated apparatus to engage behind the magnetic tape. Moreover, there are openings 43 and 45 for cooperation with locating pins of an apparatus. All these openings are situated in a thicker portion 47 of the cassette. The presence of the thicker portion enables magnetic-head means and pressure-roller means to be used which can be substantially wider than the width of the magnetic tape 19. On the side walls 9 and 11 the conventional cassette has short raised members 51 and 53 which were originally intended to preclude misinsertion of a cassette into an apparatus but which currently no longer have any function.

Conventional reversible cassettes are standardized and intended to cooperate with associated record/reproduce apparatus. An example of such an apparatus is shown diagrammatically in FIG. 8. Since such Compact Cassette apparatus is well-known and that shown herein differs mechanically from that of the prior-art apparatus merely in some details, it will be described only briefly with the emphasis on the deviating features.

The apparatus comprises a cassette holder 55 for receiving a cassette. Two winding spindles 57 and 59 are provided for engaging with the reel hubs 21 and 23 of the cassette. The apparatus shown in the drawing is a two standard drive and comprises magnetic-head means 61 by means of which it is possible at least to playback Compact Cassettes. However, the magnetic-head means is also configured to record and reproduce digital signals on a new digital audio cassette 63 in accordance with the invention, see FIGS. 4 to 6. For a more detailed description of suitable magnetic-head means reference is made to the Applicant's afore-mentioned Patent Application NL 8,901,712.

Figure 8:
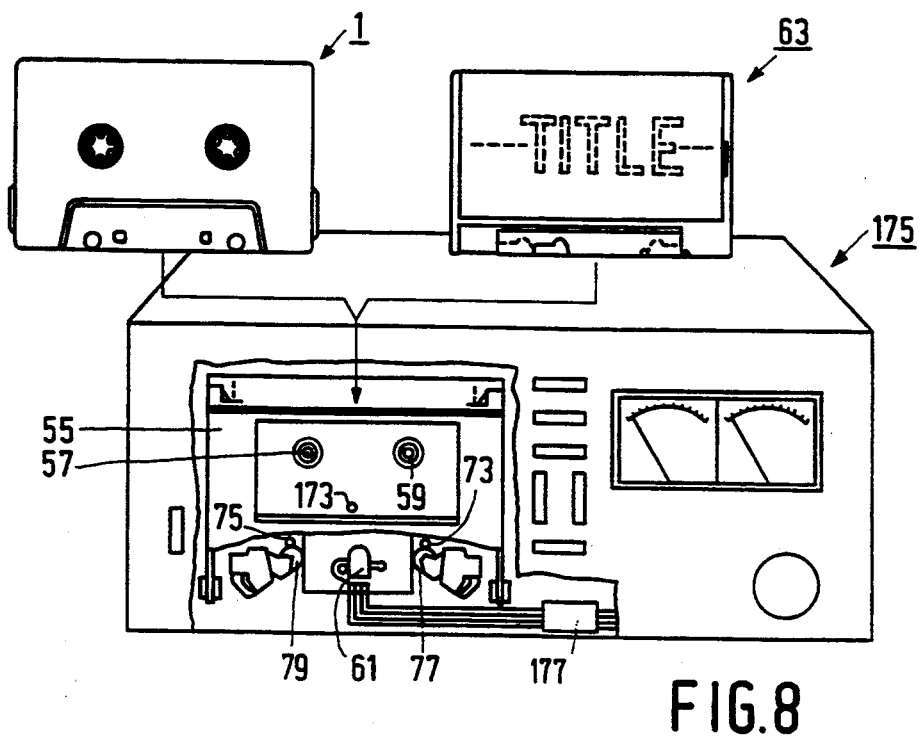
FIG. 8 is a perspective view at the front of an apparatus and a Compact Cassette as well as a new cassette constructed to cooperate with the apparatus, some parts of the front of the apparatus being not shown.

As with the Compact Cassettes 1 the new cassette 63, see FIGS. 4 to 7, comprises coplanar spools 155 and 157 of magnetic tape. The new cassettes belong to a new format which deviates from the existing standard but are constructed to cooperate with the apparatus as shown in FIG. 8. However, in contrast with the Compact Cassette the new cassette is not designed for reversible operation i.e. it can only be operably positioned on the tape apparatus in one direction. It has plane-parallel main walls 65 and 67, of which only the last-mentioned wall is formed with winding spindle openings 69 and 71 comparable with the openings 15 and 17 in the main walls of the Compact Cassette shown in FIGS. 1 to 3 and hence why it can only be mounted on the tape apparatus in the one direction. The openings 69 and 71 are spaced at the same distance from one another as the openings 15 and 17 and have the same diameter. As a result of this, and also because the new cassette 63 corresponds to the Compact Cassette 1 in other respects, the cassette 63 is suitable for cooperation with the mechanism of the apparatus of FIG 8.

As stated above, the main wall 65 is not formed with openings and the new cassette 63 is not physically reversible in the cassette holder 55, as is the standard cassette having winding spindle openings in both main walls. However, an essential feature of new apparatus for the new cassette is that it comprises means for recording/reproducing signals on/from the magnetic tape in both directions of transport. The apparatus shown in FIG. 8 comprises two capstans 73 and 75 and two pressure rollers 77 and 79 for cooperation with the capstans. The use of two capstans and two pressure rollers in a magnetic-tape cassette apparatus is known per se. Apparatus having these provisions are used in conjunction with Compact Cassettes and generally referred to as "auto-reverse" apparatus because they comprise means for automatically reversing the direction of transport of the magnetic tape when the end of the tape is reached. In such prior-art apparatus Compact Cassettes, although reversible, need not be physically reversed in position. The user need not physically reverse the position of the cassette halfway through playing one side of the tape which adds to the operating convenience of the apparatus. However, this feature leads to a slight increase in the cost of the apparatus and is therefore regarded as a non-essential luxury feature. However, in contrast, the new format prescribes a reverse provision, automatic or not, as a standard feature for the new apparatus in accordance with the invention, which is indispensable in conjunction with the non-reversibility of the cassette 63.

The new cassette 63 may be provided with a slide cover 81. Where the slide cover only covers a small part of the main wall 67 of the cassette, FIG. 4, the slide cover has only a small width. For the other main wall 65 bottom of the cassette, FIG. 6, the slide cover has a width such that in its closed position it covers the winding spindle openings 69 and 71 in the main wall 67. In this way an excellent protection of the cassette against the ingress of dirt is assured. Conveniently the greater part of the imperforate main wall 65 may be constituted by a substantially flat labelling area 83 for applying a label by printing, gluing or otherwise.

Figure 6:
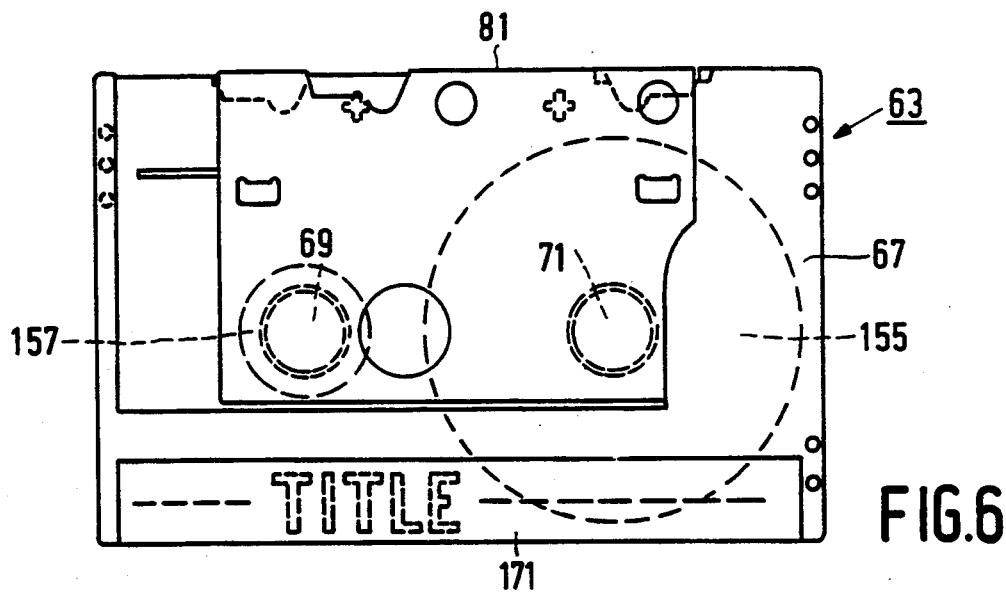
FIG. 6 is an underneath view of the new cassette shown in FIG. 4.
Figure 5:
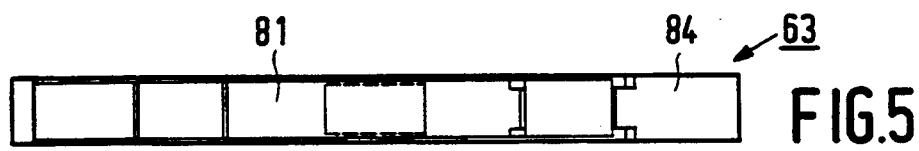
FIG. 5 is a front view at the front of the new cassette shown in FIG. 4.
Figure 4:
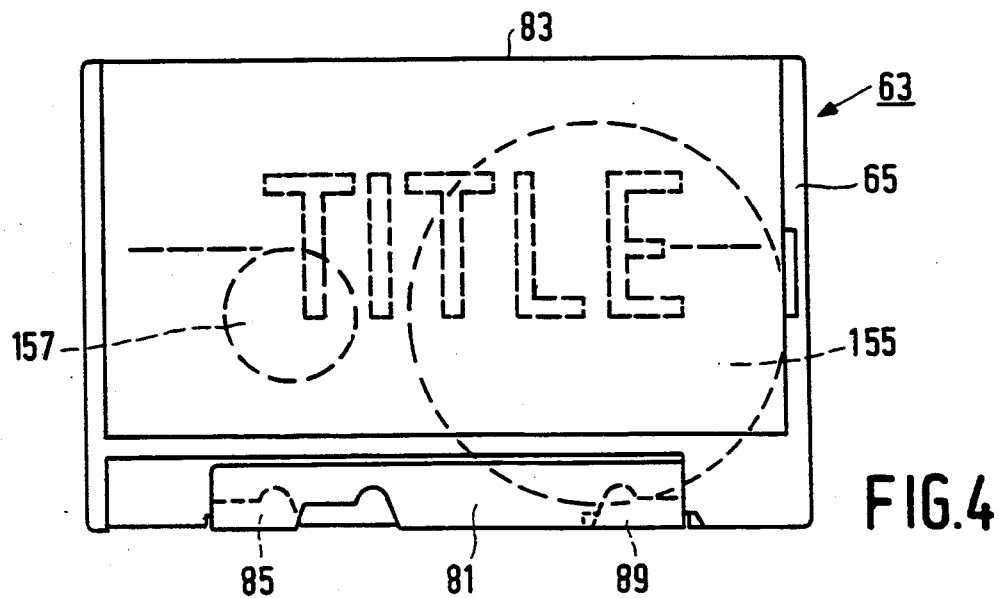
FIG. 4 is a plan view of a new cassette.

In FIGS. 4 to 6 the slide cover 81 is shown in its closed position. In its front wall 84 the new cassette 63 has openings 85, 87 and 89, see in particular FIG. 7. The openings 85 and 89 serve to provide the capstan and the pressure roller of associated apparatus access to the magnetic tape 91. The openings are shaped in such a way that a pressure roller and a capstan can be used having a height greater than the depth of the cassette itself. The slide cover 81 is formed with openings 93 and 95. These openings are formed in a front wall 97 positionally corresponding to the front wall 84, the two openings 93 and 95 dividing the front wall 97 into three separate parts 97-1, 97-2 and 97-3. In the slide's closed position these three parts substantially cover the openings 85, 87 and 89 in the front wall 84. The openings 85, 87 and 89 divide the cassette's front wall 84 into four parts 84-1 to 84-4. In the open position of the slide the part 97-3 of the slide overlies the part 84-3 of the front wall of the cassette and the parts 97-2 and 97-1 overly the parts 84-2 and 84-1 respectively. In brief: the opening 85 of the cassette is exposed by the opening 93 of the slide, the opening 87 is exposed by the opening 95 and the opening 89 is exposed in that the slide 81 is opened to a position beyond this opening.

Figure 9:
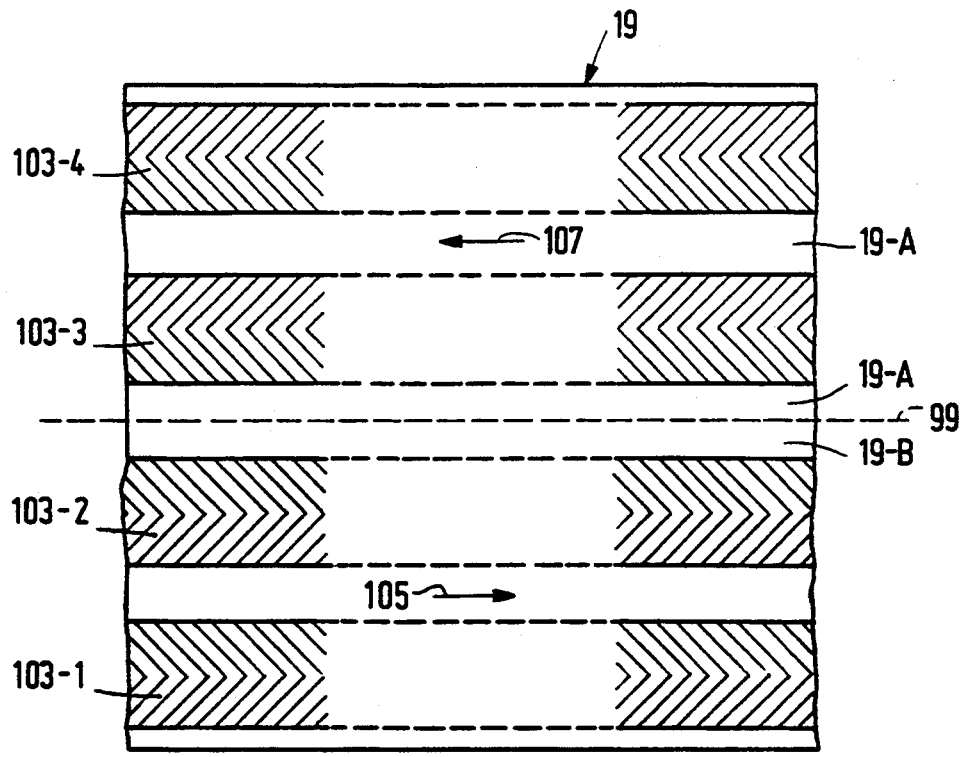
FIG. 9 is a view to a highly enlarged scale, showing a part of a magnetic tape of the cassette in FIG. 1 and the track pattern on this tape.
Figure 10:
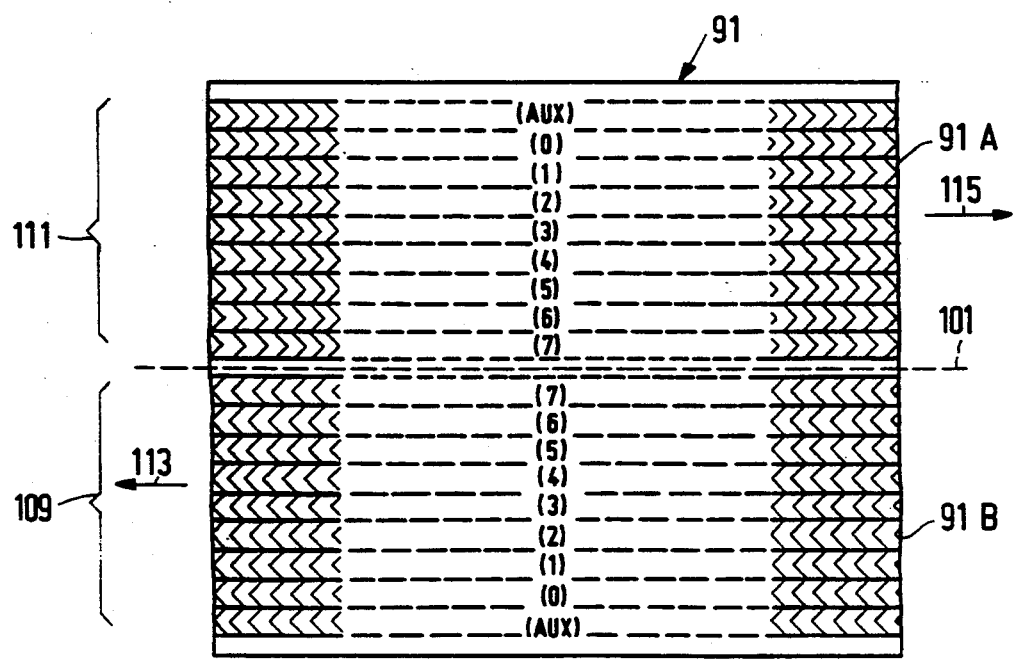
FIG. 10 is a view similar to that in FIG. 9, showing the track pattern of the cassette in FIG. 4, FIGS. 11A and 13B are a perspective view of a Compact Cassette and a supply spool from which the magnetic tape is loaded into the cassette.

As already stated hereinbefore, the cassettes of the conventional type in the new system shown in the drawings are Compact Cassettes, i.e. cassettes in conformity with the international standard IEC 94-7. With both the Compact Cassette and the new cassette 63 the magnetic tape can be wound in forward and reverse directions to record/reproduce signals in longitudinal forward first and reverse second track patterns respectively in first and second zones situated adjacent one another over the length of the magnetic tape. FIGS. 9 and 10 show diagrammatically and to a highly enlarged scale a part of a magnetic tape 19 of a Compact Cassette and a part of the magnetic tape 91 of a new cassette. Both Figures are views of the magnetic tape as seen through the openings in the front wall of the cassette, i.e. looking at the active side of the magnetic tape carrying the magnetisable material. The magnetic tape 19 is notionally divided into two respective zones 19A and 19B, a broken line 99 indicating the longitudinal centre of the magnetic tape. The zones 19A and 19B each cover one half of the magnetic tape. The magnetic tape 91 is also notionally divided into two respective zones, 91A and 91B and a broken line 101 indicates the longitudinal centre of the magnetic tape. The magnetic tapes 19 and 91 have the same width, which is desirable in view of the fact that the new apparatus should be capable of operating with cassettes of both types. Apparatus parts such as the capstan and the pressure roller can be given optimum dimensions depending on the identical width of the magnetic tapes used in the two kinds of cassettes.

FIG. 9 shows track patterns in conformity with the Compact Cassette standard. The track pattern situated in the zone 19B comprises two tracks, i.e. the tracks 103-1 and 103-2. In accordance with the Compact Cassette standard the analogue tracks 103-1 and 103-2 must be used concurrently, in the case of stereophonic recordings, for a first direction of transport at a first side of the magnetic tape. The corresponding direction of transport is indicated by the arrow 105. In the standard the zone 19B is regarded as side "1" of the magnetic tape. The zone 19A is regarded as side "2". The track pattern of this side comprises the two analogue tracks 103-3 and 103-4, which must be used concurrently in a second direction of transport as indicated by the arrow 107.

In the plan view shown in FIG. 1, which illustrates the cassette near one of its starting positions; the spool 25 is nearly full of magnetic tape and the spool 27 is nearly empty and the magnetic tape is ready to record/reproduce the tracks 103-1 and 103-2 and is positioned near the end of the second track pattern comprising the track 103-3 and 103-4. In an intermediate position the right-hand spool 27 is full of tape and the left-hand spool 25 is empty and the magnetic tape is positioned at the end of the first track pattern 103-1/103-2 and hence at the beginning of the second track pattern 103-3/103-4. In the view of the imperforate main wall 65 of the new cassette 63 with the front 84 of the cassette facing the bottom of the figure, i.e. in a view as given in FIG. 4, the nearly full spool 155, when near the starting position, is situated at the right-hand side and the magnetic tape is ready to record/reproduce the first track pattern in a direction of transport from the right to the left.

The track pattern on the magnetic tape of the new cassette will be described in more detail with reference to FIG. 10. It comprises a first track pattern 109 on the first side of the magnetic tape—i.e. the first zone 91B—and a second track pattern 111 on the second side of the magnetic tape—i.e. the second zone 91A. Each of the two track patterns 109 and 111 comprises nine digital tracks in total. For the sake of clarity the individual tracks of each track pattern bear the numerals (0)–(7) or the letters (AUX) in FIG. 10. The letters (AUX) refer to an auxiliary track. This auxiliary track can be used for recording digital auxiliary information. The other tracks (0) to (7) of each track pattern are used for digitally recording audio information. The first side of the magnetic tape 91, i.e. the zone 91B, is used in a first direction of transport as indicated by the arrow 113. The second side of the magnetic tape, i.e. the zone 91A, is used in the second direction of transport as indicated by the arrow 115. A comparison between the track patterns of the magnetic tapes of FIGS. 9 and 10 shows that for recording/reproducing stereo audio information the magnetic tape of FIG. 9 is conventionally first used from the left to the right and subsequently from the right to the left. The magnetic tape 91 of FIG. 10, however, is first used from the right to the left and then from the left to the right. The first track pattern of both magnetic tapes is situated in the lower zone of the magnetic tape and the second track pattern is situated in the upper zone. The significance of this choice will be explained with reference to FIGS. 11 to 17.

Figure 11A:
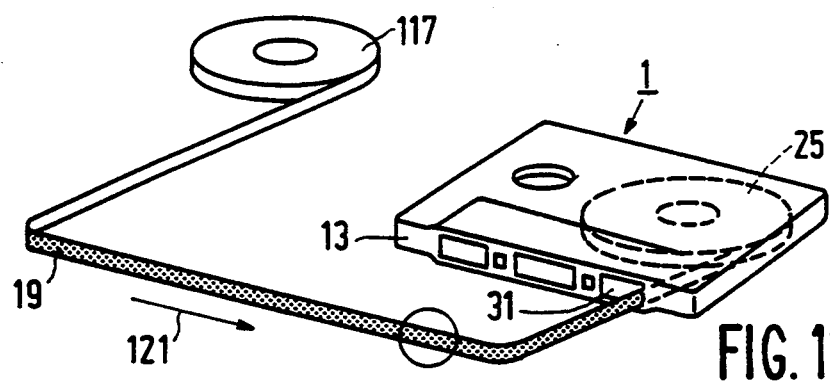
Figure 11B:
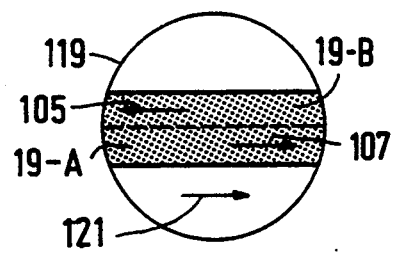
Figure 12:
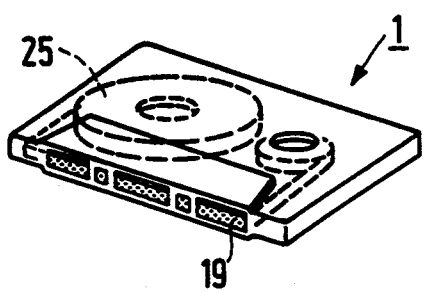
FIG. 12 shows a Compact Cassette after loading of the cassette and positioned in such a way that the magnetic tape is in a starting position, FIGS. 13A and B are a perspective view similar to that in FIG. 11 but illustrating the process of loading a new cassette.
Figure 14:
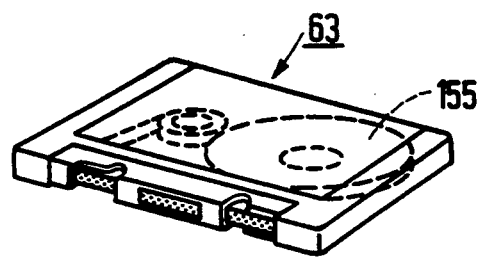
FIG. 14 shows the cassette of FIG. 13 after loading of the cassette, the magnetic tape again being shown in a starting position, FIG. 15 diagrammatically illustrates a number of stages in the duplication of pre-recorded Compact Cassettes, FIGS. 16-A,(a) and (b), and 16-B(a) and (b) include perspective views showing a magnetic tape spool and plan views showing a magnetic head for recording/reproducing analog signals on/from a Compact Cassette in a first track pattern and a second track pattern respectively, and FIGS. 17-A, and 17-B(a) and (b) show views similar to those in FIGS. 16-Aa and b and 16-Ba and b but now for the magnetic tape of a new cassette.
Figure 13A:
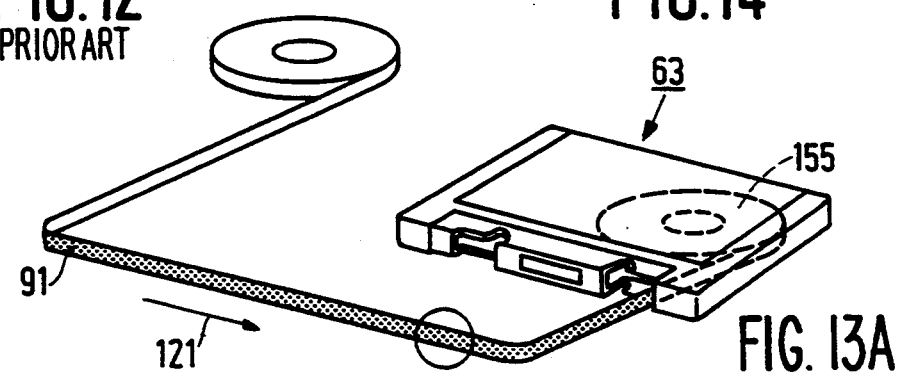
Figure 13B:
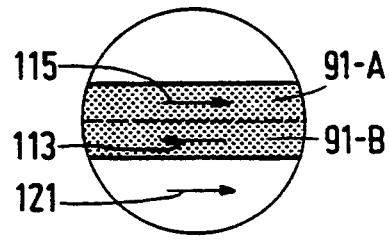

FIG. 11 very diagrammatically indicates how a Compact Cassette 1 is filled with a magnetic tape 19. The magnetic tape is fed from a supply spool 117 and is wound through the opening 31 in the front wall 13 to form the spool 25 in the cassette. In the drawing the active side of the magnetic tape has been marked with a pattern of dots. A part of the magnetic tape 19 is shown to an enlarged scale in the circle 119. The magnetic tape is loaded in a direction indicated by an arrow 121. The zone 19A is situated at the lower side and the zone 19B is situated at the upper side of the magnetic tape. When the spool 25 is full the magnetic tape is severed and is attached to the other reel hub (23). When the cassette is now inverted the situation of FIG. 12 is obtained, in which the cassette is ready to start recording/reproduction of the first track pattern and the full spool 25 is situated at the left-hand side. In particular in the case of Compact Cassettes sold with a prerecorded music programme and referred to as "Musicassettes" it is important that the cassette is delivered in such a way that it is ready to play the prerecorded music immediately after the cassette has been loaded into an apparatus, i.e. without the magnetic tape having to be rewound. Even when cassettes are not provided prerecorded, referred to as blank cassettes, these cassettes are preferably supplied to the consumer with a full left-hand reel, so that it is possible to start directly with the recording of music at the beginning of side "1" of the magnetic tape.

Figure 15:
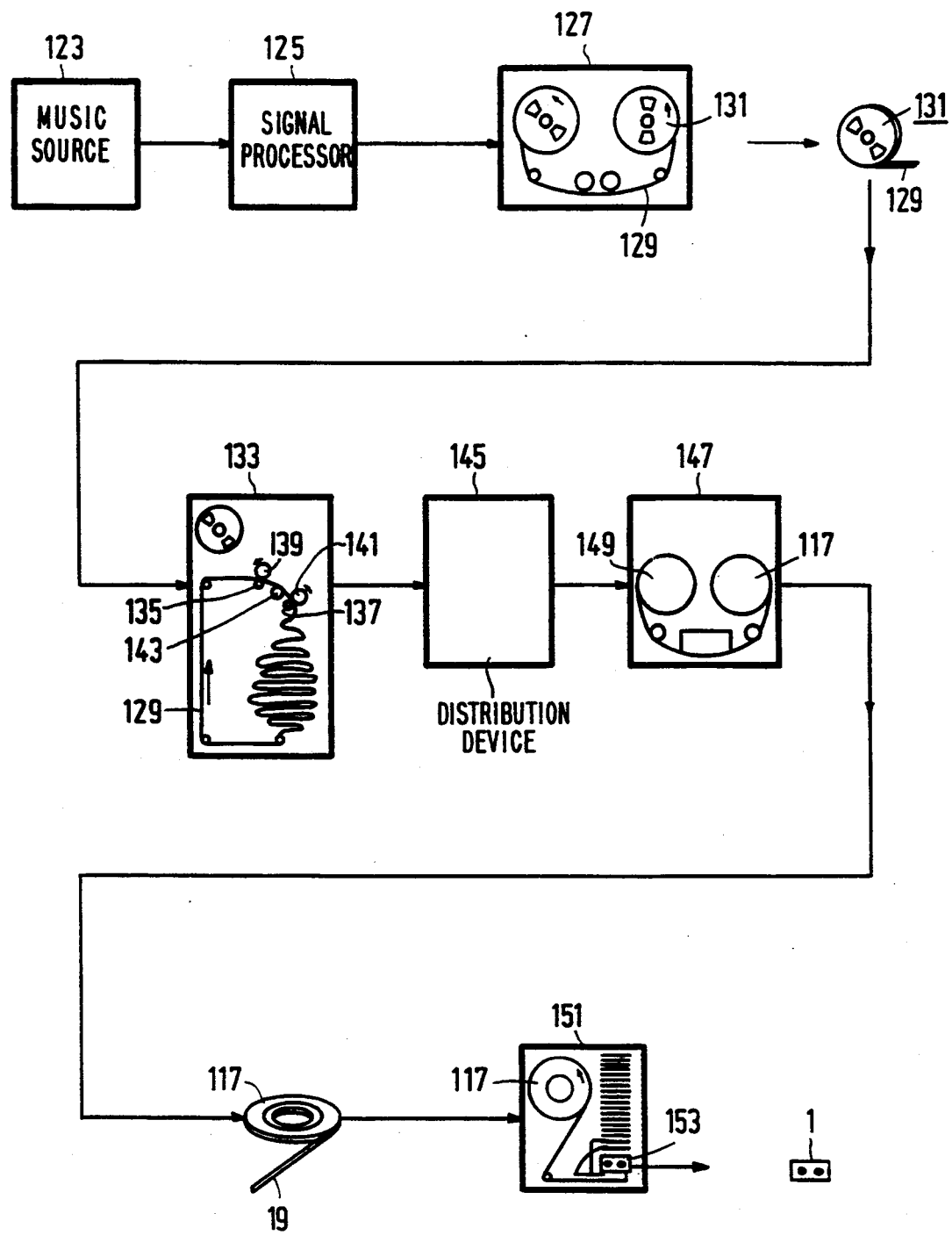

FIG. 15 very diagrammatically illustrates the reproduction process used in general for the manufacture of Musicassettes. Music from an arbitrary source is reproduced by an apparatus diagrammatically represented as a block 123 and is converted into electric signals. These signals are applied to a professional magnetic tape recorder 127, if desired via a diagrammatically shown signal processing device 125, for example for noise reduction, which recorder records the signal on a magnetic tape 129 which is wound to form a reel 131. The magnetic tape 129, called the master tape, is loaded into a reproducing machine 133 in which the ends of the magnetic tape are spliced to each other to form an endless tape containing the desired recordings. In the machine the endless tape is driven by means of capstans 135 and 137 and pressure rollers 139 and 141 at a considerably higher than normal playing speed, for example 32 or 64 times the normal playback speed of the magnetic tape. This high speed enables the signals to be recorded on magnetic tapes for Musicassettes at a rate which is 32 or 64 times as high as the normal recording/playback speed of the magnetic tape. The signals on the magnetic tape 129 are simultaneously read from all four tracks by means of quadruple magnetic-head means 143. The electric output signal is applied to a distributing device 145 to which a number of slave apparatus 147 can be connected in parallel. For simplicity the drawing shows only one slave apparatus 147. In fact, the slave apparatus is a magnetic tape recorder, which starting from a first supply reel 149 containing blank magnetic tape transfers the electric signals to the four tracks of the magnetic tape 19 with said 32-fold or 64-fold speed, with the aid of magnetic-head means, not shown, thereby providing the supply spool 117 with the desired music programme. The magnetic tape 19 on the supply spool 117 is very long so that the music programme can be recorded many times in succession on the magnetic tape whose active side faces inwards on the spool. The supply spool 117 thus manufactured is mounted on a loading machine 151. So-called "C-O" cassettes 153 are fed to the loading machine. These are cassettes which do not as yet contain magnetic tape and whose reel hubs are connected to each other by a leader tape, this being a length of tape which is not provided with magnetic material. In the loading machine 151 the leader tape is pulled out, severed in the middle, spliced to the magnetic tape 19 at one end, after which it can be wound to form the spool 25. When winding is completed the magnetic tape, whose active side now faces outwards on spool 25, is severed again and the wound part of the magnetic tape is spliced to the other part of the leader tape. After this cycle the loading machine 151 is ready to load a next C-O cassette.

The industry employs many loading machines corresponding to the loading machine 151. In general they are constructed to load the cassette at the right-hand side as seen in FIG. 11. However, the track pattern is such that after reversal, see FIG. 12, the full spool 25 is situated at the left-hand side of the cassette in the desired starting position. However, non-reversible cassettes 63, which have winding spindle openings in only one main wall, cannot be physically reversed for recording/reproducing. If the track configuration of the new cassettes 63 were selected in such a way that in the new cassettes the full spool would be situated at the left-hand side in the starting position with the above spooling equipment, an additional step would have to be added to the production process after filling of every cassette, i.e. rewinding the magnetic tape from the right-hand reel to the left-hand reel. This in fact unproductive operation would require a disproportionately long occupation of the loading machine 151 and would lead to a very inefficient production process. Nevertheless it may be desirable that the existing production machines can be used for the new cassettes, so that then it may be an advantage to select the track configuration in the new cassette, in contradistinction to the Compact Cassette standard, in such a way that in the starting position the full reel is situated at the right-hand side of the cassette.

As set forth above, it is important to select the first and second directions of transport of the two types of cassette opposite to each other. However, it is also of great importance to ensure that the first track pattern of a new cassette is situated at the same side of the magnetic tape as in the Compact Cassette. The significance of this will be explained with reference to FIGS. 16A to 17B.

Figure 16A:
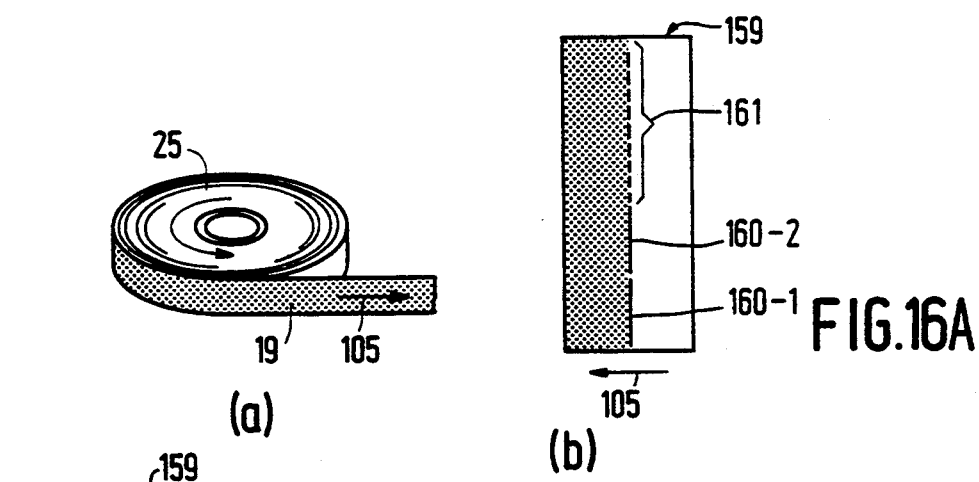
Figure 16B:
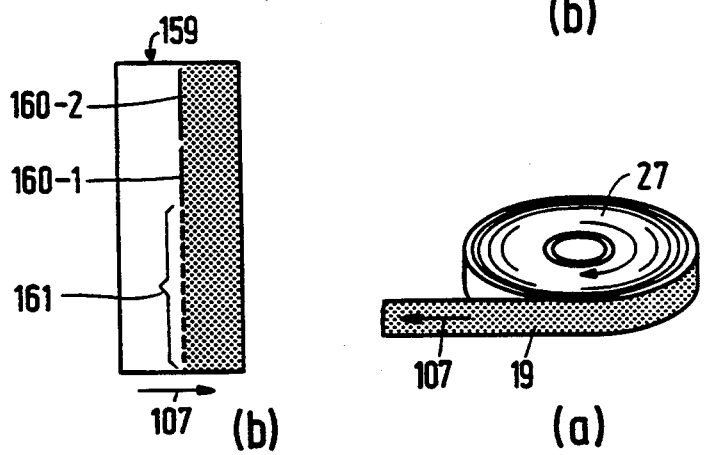

The Figures very diagrammatically show the spools 25 and 27 for the Compact Cassette and the spools 155 and 157 for the new cassette. In the Figures the active side of the magnetic tape faces outwards from the spools. In FIG. 16A the magnetic tape 19 moves in the first transport direction 105 to record/reproduce signals in the first track pattern comprising the tracks 103-1 and 103-2, see FIG. 9. In FIG. 16B the magnetic tape 19 moves in the second transport direction 107 to record-/reproduce the second track pattern comprising the tracks 103-3 and 103-4. Likewise, the magnetic tape 91 in FIG. 17A moves in the first transport direction 113 to record/reproduce the first track pattern 109 and in FIG. 17B the magnetic tape moves in the second transport direction 115 to record/reproduce the second track pattern 111. The (b) portions of these Figures diagrammatically show a magnetic head 159 to an enlarged scale with its head face, i.e. that side of the magnetic head which is in contact with the active side of the magnetic tape, facing the observer of the drawing; however, in reality the magnetic head should be positioned just the other way around to contact the active side of the magnetic tape. The head is an integrated magnetic head having two analog head gaps 160-1 and 160-2 for recording/reproducing the two analog tracks belonging to the head pattern of the Compact Cassette standard. Moreover, the magnetic head has nine digital head gaps 161 for recording/reproducing the digital track patterns 109 and 111 in conformity with the new format. The two portions comprising the analog and the digital head gaps each only contact one of the two zones of the magnetic tape.

It is common knowledge that in general magnetic heads do not have a symmetrical characteristic. This means that the operation of the magnetic head is optimised for a specific direction of movement of the magnetic tape. In FIGS. 16A to 17B one of the two sides of the magnetic head, adjacent the head gaps, is shown provided with a dot pattern. Allowing for the fact that the head face of the magnetic head 159 is directed towards the observer, it will be evident that in the Figures the non-dotted part of the magnetic head is the part where the magnetic head for the first time comes into contact with the magnetic tape. For the sake of clarity the direction of tape transport over the magnetic head is indicated by an appropriately numbered arrow below the magnetic head in the Figures.

Figure 17A:
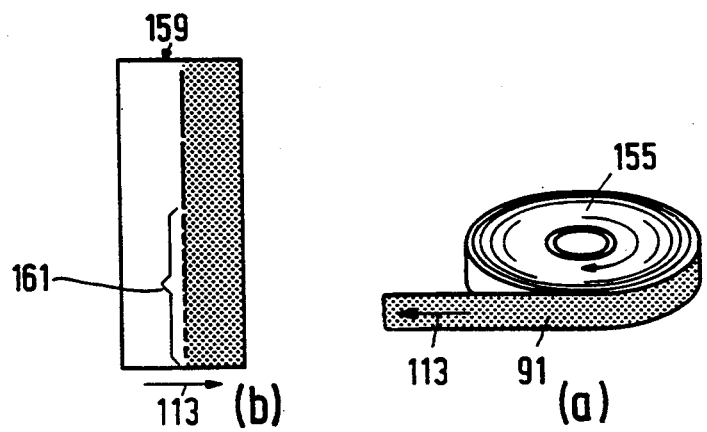
Figure 17B:
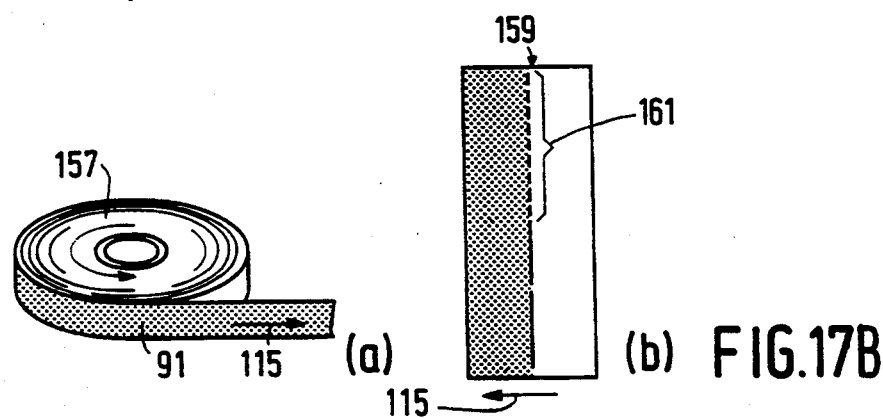

FIG. 16A shows the analog head gaps 160-1 and 160-2 in the correct position for recording/reproducing the two tracks 103-1 and 103-2 of the first analog track pattern. In FIG. 16B the magnetic head is brought into an inverted position by suitable means (not shown) of the apparatus of FIG. 8, so that the head gaps 160-1 and 160-2 are in the correct position for recording/reproducing the second analog track pattern 103-3/103-4. In other words, the position of the magnetic head 159 in FIG. 16A should be used only if the magnetic tape moves in a direction of transport similar to the transport direction 105 and the position of the magnetic head in FIG. 16B should be used only if the magnetic tape moves in a direction of transport similar to the transport direction 107. This means that only the situation illustrated in FIGS. 17A and 17B is suitable for the new magnetic-tape cassette. This also means that the first track pattern 109 should be situated at the lower side of the magnetic tape and the second track pattern 111 at the upper side, in conformity with the fact that the digital gaps 161 are situated at the lower side in FIG. 17A and at the upper side of the magnetic head in FIG. 17B.

It should be noted that in principle it is possible to manufacture the magnetic heads 159 from two different parts, one part being provided with the analog gaps and the other part with the digital gaps. In such a case it is possible to arrange for the part formed with the digital gaps to be inverted, so that the marked part will be situated at the other side. In that case the track pattern for the new cassette will be exactly the other way around to that so far described. However, in the case of such a two-part magnetic head it is also possible to arrange the marked parts in the same way as illustrated in FIGS. 16A to 17B. The embodiment of the invention is therefore suitable both for magnetic heads not made of two different parts and for two-part magnetic heads.

FIG. 16B, in combination with FIGS. 9 and 10, can be used to illustrate an alternative feature of the invention. In this case the zone 91A should be regarded as the first zone of the digital magnetic tape, the associated forward first direction of transport being the direction indicated by the arrow 115. The second zone is 91B and the arrow 113 indicates the reverse second transport direction. The reel in FIG. 16A may now contain either a digital or an analog magnetic tape, the forward first direction of transport now being as indicated by the arrow 105 in both cases. If the tape is an analog tape the first track pattern moves over the analog head gaps 160-1 and 160-2 but if the tape is a digital tape the first track pattern moves over the digital head gaps 161 (FIG. 16A). In both cases the head contacts the magnetic tape for the first time in the non-marked zone.

As explained above the invention provides a recording/reproducing system which may include the prior-art Compact Cassettes and apparatus on which Compact Cassettes can be played but on which the new cassettes can also be used, both for recording and for reproducing digitally encoded music and speech. The advantage of the new cassette is that a larger part of its surface is imperforate because it is not reversible and therefore requires openings in only one of its two main surfaces to allow engagement with the winding spindles of the apparatus. However, the fact that the new cassette is not reversible is not a disadvantage because the new apparatus, as a standard feature, comprise means for reversing the direction of transport of the magnetic tape. Moreover, the track configuration of the new cassettes may be such that these cassettes can be loaded with a magnetic tape at a high rate and at low cost on existing machines with a minimum of adaptation. The fact that in the new cassette in the starting position, in which the cassette is ready to start recording/reproducing signals in the first track pattern, the full reel may be situated at another side than in the Compact Cassette is only a minor drawback. The risk that this may confuse the user decreases as the new cassette is given a more imperforate appearance. Alternatively, the full reel may be situated at the same side as in the Compact Cassette, the two zones on the tape being suitably interchanged.

The invention not only relates to a new system but also to the associated new cassettes themselves. These cassettes may comprise for example, see FIG. 7, a transparent window 163 which covers the labelling area 83 of the main wall 65 of the cassette. Between the window 163 and the main wall 65 a paper label 165 may be inserted, for example printed in color. The window also comprises a narrow rear portion 167 covering a correspondingly narrow folded rear portion 169 of the label. Thus, the cassette may be provided with information both at the upper side and at the back. However, it is alternatively possible, see FIG. 6, to provide information in a labelling area 171 at the bottom on the main wall 67. In a simple embodiment, not shown, it may be adequate to provide information on the main wall 65 only, for example to be printed directly on the cassette housing or on a medium such as paper or plastic foil to be glued on the cassette. This is a substantial advantage in view of the price of simple cassettes. This possibility is obtained in that the new cassettes 63 are imperforate on one main wall 65, so that a large printing area is available. Moreover, the same side always faces up so that printing on the other side is not necessary.

The invention also relates to the new apparatus. The apparatus shown in FIG. 8 comprises automatic detection means for detecting whether an inserted cassette is of the conventional type or of the new type. The detection means may comprise, for example, a pin 173 arranged on the tape deck of the apparatus to detect the presence of the thicker portion at the front of a Compact Cassette. Consequently, the pin 173 is depressed by the thicker portion 47 of the cassette 1 (FIG. 3) but is not depressed by a cassette 63 (FIGS. 4 to 7) owing to the absence of such a thicker portion. If the pin 173 actuates a switch in a control circuit of the apparatus it is thus possible to detect which type of cassette has been inserted. Switching means 177 in the apparatus is actuated depending on the type of the cassette, to adapt the direction of transport of the magnetic tape to the type of cassette being used, if necessary, and to switch between amplifiers connected to the analog head gaps and amplifiers connected to the digital head gaps.

Although the invention has been described for a highly advantageous two-standard system including both the prior-art Compact Cassette system (at least for the reproduction of signals) and a new system, the invention is not limited to this single example but also relates to any embodiment possible within the scope defined by the appended Claims. The main idea of the invention is to employ cassettes with longitudinal track patterns in two adjacent zones on a magnetic tape which can be recorded and played back in a forward and a reverse direction, but to make the cassettes nevertheless non-reversible and to make one of the main walls wholly imperforate to protect the interior of the cassette, and also to combine these cassettes in a new system with apparatus which, without exception, comprise means for transport of the magnetic tape in the forward and the reverse direction without positional reversal of the cassette. For the first time this yields a system comprising non-reversible effectively protected cassettes, which do not require a user to wait until the cassette has been rewound after playing and which do not require any rewinding operations. After playing the cassette is immediately ready to be played again. Moreover, the cassette is also immediately ready to be played after a recording occupying the complete tape has been made.

More particularly, the main idea is to provide a two-standard system comprising the well known Compact Cassette system as well as a new system comprising modified cassettes which can be driven interchangeably with Compact Cassettes on a suitable two standard drive but which, unlike the Compact Cassettes, comprise a shutter covering the front side of the cassette, a considerable part of one of the main walls including the spindle drive openings and a small part of the other main wall, which other main wall is closed so that the cassette is not physically reversible on the drive, the drive being capable of recording and to playing back on/from the new cassettes in two tape transport directions. Starting from a starting position in which one of the tape spools is full, the tape spool is unwound during tape transport in the first direction and rewound during tape transport in the second direction, after which all available tracks will have been recorded/reproduced.

We claim:

1. The combination of a magnetic tape cassette apparatus and a magnetic tape cassette, said combination comprising:

a magnetic tape cassette comprising a housing having first and second main walls interconnected by side walls, one of said side walls defining a front wall and include a magnetic head access opening, first and second tape reels, each including a reel hub, rotatably disposed within said housing, and a length of magnetic tape connected to said tape reels for transport between said reels past said head access opening upon rotation of said reels, said first main wall including a pair of reel hub access holes positioned about each of said reel hubs and said second main wall being free of said reel hub access holes; and a magnetic tape cassette apparatus for at least one of recording and reproducing signals from said magnetic tape in said magnetic tape cassette, said apparatus including:

cassette receiving means for receiving a cassette, a pair of winding spindles for driving said reel hubs of said cassette in opposite directions of rotation for transporting said magnetic tape in a forward and an opposite, reverse direction of tape transport, said cassette being physically non-reversible in said cassette receiving means such that said winding spindles are received in said reel hubs only through said reel hub access holes in said first main wall and not through said second main wall, magnetic head means for at least one of digitally recording and digitally reproducing signals from the magnetic tape in a respective longitudinal forward first track pattern and a reverse second track pattern in first and second zones situated adjacent each other over the length of said magnetic tape, means for reproducing signals from a reversible cassette having a pair of tape reels each with a respective reel hub and opposing main walls each with respective reel hub openings automatic detection means for detecting whether a cassette received in said cassette receiving means is of said reversible type or of said physically non-reversible type having reel hub access holes in only one main wall, and switching means for changing the direction of rotation of said winding spindles from one direction of tape transport to the other direction of tape transport depending on the type of cassette detected by said detection means.

2. The combination according to claim 1, characterized in that the cassette further includes a sliding cover which is movable between a closed position, in which the magnetic head access opening is covered, and an open position, in which the magnetic head access opening is uncovered, which sliding cover covers only a minor part of said second main wall which is free of said reel hub access holes, and the remainder of said second main wall not covered by said sliding cover is constituted mainly by a substantially flat labelling area for receiving a label.

3. The combination according to claim 1, characterized in that:

said magnetic head means is adapted to record and reproduce signals in a respective longitudinal forward first track pattern and a reverse second track pattern in first and second zones respectively situated adjacent each other over the length of the magnetic tape, in that said cassette defines a starting position in which one of said tape reels is substantially full and the other is substantially empty and the magnetic tape is ready to start recording and/or reproduction of the first track pattern and said magnetic head means is positioned at the end of the second track pattern, and an intermediate position in which said other tape reel is substantially full and said one tape reel is substantially empty and said magnetic head means is positioned at the end of the first track pattern, and in that in the starting position, viewed through said second main wall of the cassette with said front wall of the cassette facing down, the full reel is situated at the right-hand side and the magnetic tape is positioned with respect to said magnetic-head means for recording and/or reproduction of the first track pattern in a transport direction from the right to the left.

4. The combination according to claim 3, characterized in that the first zone, in which the first track pattern is located, is situated near said first main wall which includes said reel hub spindle access Openings.

5. The combination according to claim 1, characterized in that:

said magnetic head means is adapted to record and/or reproduce signals in a respective longitudinal forward first track pattern and a reverse second track pattern in first and second zones respectively situated adjacent each other over the length of the magnetic tape, in that said cassette defines a starting position in which one of the reels is substantially full and the other is substantially empty and the magnetic tape is ready to start recording and/or reproduction of the first track pattern and said magnetic head means is positioned at the end of the second track pattern, and an intermediate position in which said other reel is substantially full and said one reel is substantially empty and the magnetic head means is positioned at the end of the first track pattern, and in that in the starting position, viewed through said second main cassette wall with the front wall of the cassette facing down, the full reel is situated at the left-hand side and the magnetic tape is positioned with respect to said magnetic head means for recording and/or reproduction of the first track pattern in the first direction of transport from left to right, and in that the first zone is situated near said second main wall.

6. The combination according to claims 5, wherein said magnetic tape apparatus further comprises:

means for producing signals from a reversible cassette having a pair of tape reels each with a respective reel hub and opposing main walls each with respective reel hub openings in conformity with the international standard IEC 94-7 (Compact Cassettes), automatic detection means for detecting whether a cassette received in said cassette receiving means is of said reversible type according to said IEC 94-7 standard or said non-reversible type having reel hub access holes in only one main wall, said magnetic-head means including first head means positioned for cooperation with said first zone of the magnetic tape and first amplifier means connected thereto, and second head means adjacent to said first head means for cooperation with said second zone of the magnetic tape and second amplifier means connected thereto, and switching means for switching over between the first and the second amplifier means depending on the type of cassette detected by the detection means.

7. The combination according to claim 1, wherein said reversible cassette is in conformity with the international standard IEC 94-7 (Compact Cassettes).

8. A magnetic tape cassette apparatus for at least one of recording and reproducing signals from a magnetic tape in first and second different types of magnetic tape cassettes both having a housing with first and second main walls interconnected by side walls, one of said side walls defining a front wall and include a magnetic head access opening, first and second tape reels, each including a reel hub, rotatably disposed within said housing, and a length of magnetic tape connected to said tape reels for transport between said reels past said magnetic head access opening upon rotation of said reels, said first cassette type including a pair of reel hub access holes in only one of said main walls, the other of said main walls being free of said reel hub access holes, and said second cassette type being reversible and including a pair of reel hub access holes in both of said main walls, said apparatus comprising:

cassette receiving means for receiving cassettes of the first and second different types, drive means including a pair of winding spindles for driving the reel hubs of the cassette in opposite directions of rotation for alternately transporting the magnetic tape in a forward and an opposite, reverse direction of transport, the winding spindles being arranged such they are received in the reel hubs of the cassette only through said reel hub spindle access holes in the first main cassette wall and not through the second main cassette wall, and magnetic head means for at least one of digitally recording on and digitally reproducing signals from the magnetic tape in the first type of tape cassette in a respective longitudinal forward first track pattern and a reverse second track pattern in first and second zones situated adjacent each other over the length of said magnetic tape, means for reproducing signals from the magnetic tape in the reversible, second type of tape cassette having reel hub access holes in both main walls, automatic detection means for detecting whether a cassette received in said cassette receiving means is of said reversible second type or of said first type having reel hub access holes in only one main wall, and means for changing the direction of rotation of the winding spindles from one direction of tape transport to the other direction of tape transport depending on the type of cassette detected by said detection means.

9. A magnetic tape cassette apparatus according to claim 8, wherein:

said magnetic-head means includes first head means positioned for cooperation with the first longitudinal zone of the magnetic tape and first amplifier means connected thereto, and second head means adjacent to said first head means for cooperation with the second longitudinal zone of the magnetic tape and second amplifier means connected thereto, and said apparatus further comprises switching means for switching between the first and the second amplifier means depending on the type of cassette detected by said detection means.

10. A magnetic tape cassette apparatus according to claim 8, wherein said magnetic head means is adapted to record and reproduce signals in a respective longitudinal forward first track pattern and a reverse, second track pattern in first and second zones respectively situated adjacent each other over the length of the magnetic tape of said first type of magnetic tape cassette, so that in a starting position of said first type of cassette in which one of the reels is substantially full and the other is substantially empty the magnetic-head means is positioned at the end of the second track pattern and is ready to start recording and/or reproduction of the first track pattern, and in this starting position, viewed through the second main wall of the first type of cassette with said cassette front wall facing down, the full reel is situated at the right-hand side, and the magnetic head means is positioned for recording on and/or reproducing from the first track pattern in a tape transport direction from the right to the left.

11. A magnetic tape cassette apparatus, according to claim 10, characterized in that said magnetic head means is positioned adjacent said first main cassette wall, which includes said reel hub access openings, for recording on and/or reproducing from the first track pattern in the first zone of the tape.

12. A magnetic tape cassette according to claim 8, wherein said magnetic head means is adapted to record and reproduce signals in a respective longitudinal forward first track pattern and a reverse, second track pattern in first and second zones respectively situated adjacent each other over the length of the magnetic tape of said first type of magnetic tape cassette, so that in a starting position of said first type of cassette in which one of the reels is substantially full and the other is substantially empty the magnetic-head means is positioned at the end of the second track pattern and is ready to start recording and/or reproduction of the first track pattern, and in this starting position, viewed through the main cassette wall with the front wall of the cassette facing down, the full reel is situated at the left-hand side and the magnetic-head means is positioned adjacent the second main cassette wall for recording on and reproducing from the first track pattern in the first zone in the first direction of transport from left to right.

13. An apparatus according to claim 8, wherein the reversible cassette is in conformity with the international standard IEC 94-7 (Compact Cassettes).

* * * * *